United States Patent
Luman et al.

(10) Patent No.: US 11,155,319 B2
(45) Date of Patent: Oct. 26, 2021

(54) DUAL-SIDED BRAKE CONTROLLER HOUSING

(71) Applicant: SRAM, LLC, Chicago, IL (US)

(72) Inventors: Nathan Luman, Oak Park, IL (US); Neil Swanson, Colorado Springs, CO (US)

(73) Assignee: SRAM, LLC, Chicago, IL (US)

(*) Notice: Subject to any disclaimer, the term of this patent is extended or adjusted under 35 U.S.C. 154(b) by 135 days.

(21) Appl. No.: 16/456,702

(22) Filed: Jun. 28, 2019

(65) Prior Publication Data

US 2020/0407011 A1  Dec. 31, 2020

(51) Int. Cl.
  *B62L 3/02* (2006.01)
  *B62K 23/02* (2006.01)
  *B62M 25/08* (2006.01)
  *B62K 23/06* (2006.01)

(52) U.S. Cl.
  CPC ............. *B62L 3/023* (2013.01); *B62K 23/06* (2013.01); *B62M 25/08* (2013.01)

(58) Field of Classification Search
  CPC ........... B62L 3/02; B62L 3/023; B62K 23/02; B62K 23/06; B62M 25/02; B62M 25/04; B62M 25/08
  See application file for complete search history.

(56) References Cited

U.S. PATENT DOCUMENTS

| | | | |
|---|---|---|---|
| 7,918,145 B1* | 4/2011 | Calendrille, Jr. ...... | G05G 11/00 74/502.2 |
| 8,201,670 B2* | 6/2012 | Tetsuka .................. | B62L 3/023 188/344 |
| 9,150,275 B2* | 10/2015 | Tetsuka ..................... | B62L 1/10 |
| 9,156,522 B2* | 10/2015 | Dunlap ................ | B60T 11/236 |
| 9,321,501 B1* | 4/2016 | Miki ...................... | B62M 25/04 |
| 9,365,260 B2* | 6/2016 | Nago ..................... | B62K 23/06 |
| 10,144,483 B2* | 12/2018 | Miki ...................... | B62K 23/06 |
| 10,183,723 B2* | 1/2019 | Swanson ................ | B62L 3/023 |
| 10,266,227 B2* | 4/2019 | Komada ................ | B62K 23/06 |
| 10,556,637 B2* | 2/2020 | Komatsu ................ | B62L 3/023 |
| 10,562,584 B2* | 2/2020 | Komada ................ | B62K 23/06 |
| 10,988,209 B1* | 4/2021 | Luman ................... | B62K 23/06 |
| 2019/0270494 A1* | 9/2019 | Liao ........................... | B62L 3/02 |
| 2021/0078671 A1* | 3/2021 | Su ........................... | B62L 3/023 |

* cited by examiner

*Primary Examiner* — Adam D Rogers

(57) ABSTRACT

A hydraulic brake control device for a bicycle includes a housing having a first side and a second side, the second side being opposite the first side. The housing includes a first hydraulic line path and a second hydraulic line path, the first hydraulic line path including a first recess at the first side of the housing and the second hydraulic line path including a second recess at the second side of the housing.

20 Claims, 13 Drawing Sheets

DUAL-SIDED BRAKE CONTROLLER HOUSING

FIELD OF THE DISCLOSURE

The present disclosure is generally directed to a control device for a bicycle.

DESCRIPTION OF RELATED ART

A traditional bicycle may slow rotation of wheels by activating one or more brakes via one or more respective brake controls. For example, a brake control attached to a brake hood mounted on the handlebars of the bicycle may be actuated by a rider. The brake hood may be connected to a front and/or rear brake via hydraulic lines.

SUMMARY

In one example, a hydraulic brake control device includes a housing having a first side and a second side, the second side being opposite the first side. The housing includes a first hydraulic line path and a second hydraulic line path, the first hydraulic line path including a first recess at the first side of the housing and the second hydraulic line path including a second recess at the second side of the housing.

In one example, an outer profile of the housing is symmetric in shape about a length of an axis extending along a length of the housing.

In one example, the hydraulic brake control device includes a clamp centered on the axis.

In one example, the clamp is configured for mounting the brake control device on a handlebar.

In one example, the hydraulic brake control device includes a shift lever and a shift control device configured to initiate a gear shift based on input from the shift lever.

In one example, the hydraulic brake control device includes a battery disposed in the housing and configured to provide power to the shift control device and an antenna configured to transmit a gear shift signal generated by the shift control device.

In one example, the hydraulic brake control device includes an outlet tube extending from the first recess to the second recess, through the housing. The outlet tube is configured to interface with the hydraulic line.

In one example, the outlet tube is configured to interface with the hydraulic line within the first recess at the first side of the housing or within the second recess at the second side of the housing.

In one example, the hydraulic brake control device includes a piston assembly including a piston slidably disposed within a master cylinder arranged in the housing and a brake lever operatively coupled to the piston such that the brake lever moves the piston from a rest position to an actuated position.

In one example, the hydraulic brake control device includes a hydraulic fluid reservoir disposed in the housing and a sleeve of the master cylinder, the sleeve including a first port providing fluid communication between the hydraulic fluid reservoir and an interior of the master cylinder. The interior of the master cylinder includes a second port providing fluid communication between the interior of the master cylinder and an outlet tube In one example, a brake control device includes a housing having a first side, a second side, the first side and the second side of the housing being disposed on either side of a plane defined by an axis of symmetry extending along a length of the housing and a clamp configured to attach the brake control device to a bicycle. The clamp is attached to the housing and is centered about the axis of symmetry.

In one example, an outer profile of the housing is symmetric on either side of the plane defined by the axis of symmetry.

In one example, the brake control device includes a first hydraulic line path and a second hydraulic line path, the first hydraulic line path including a first recess at the first side of the housing and the second hydraulic line path including a second recess at the second side of the housing.

In one example, the brake control device includes an outlet tube extending from the first recess to the second recess, through the housing. The outlet tube is configured to interface with the hydraulic line.

In one example, the outlet tube is configured to interface with the hydraulic line within the first recess at the first side of the housing or within the second recess at the second side of the housing.

In one example, the brake control device includes a shift lever and a shift control device configured to initiate a gear shift based on input from the shift control.

In one example, the brake control device includes a battery configured to provide power to the shift control device and an antenna configured to transmit a gear shift signal generated by the shift control device.

In one example, the brake control device includes a piston assembly including a piston slidably disposed within a master cylinder arranged in a horn portion of the housing and a brake lever operatively coupled to the piston such that the brake lever moves the piston from a rest position to an actuated position.

In one example, the brake control device includes a hydraulic fluid reservoir disposed in the housing and in fluid communication with the master cylinder and a reservoir plug disposed in an aperture in the housing and configured to seal the hydraulic fluid reservoir.

In one example, a brake system includes a braking control device. The braking control device includes a housing having a first side and a second side, the second side being opposite the first side. The housing includes a master cylinder and a first hydraulic line path and a second hydraulic line path, the first hydraulic line path including a first recess at the first side of the housing and the second hydraulic line path including a second recess at the second side of the housing. The first hydraulic line path and the second hydraulic line path are configured to support a hydraulic line in fluid communication with the master cylinder.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A brake controller housing (e.g., a brake hood) may support components of a brake controller for actuating a brake of a bicycle. For bicycles with traditional drop-bar handlebars, a brake hood is configured for installation on either a right side or a left side of the handlebars of the bicycle. In other words, the brake hood for the right side of the handlebars is configured differently than the brake hood for the left side of the handlebars. Due to the different configurations of the left side and right side brake hoods, respectively, different manufacturing tools are used to produce the different brake hoods. Independent manufacturing tools for each brake hood requires individual tuning or optimization of the manufacturing process for the respective brake hood. This is particularly true of molded or forged brake hood components, but may also be true for other manufacturing techniques as well. Further, inspection and testing are also required for each of the different brake hoods. Separately developing, manufacturing, inspecting, and testing the right side brake hood and the left side brake hood thus increases the cost of producing the brake hoods.

A dual-sided brake hood may provide a solution to one or more of the problems described above. The dual-sided brake hood may be installed on the right side or the left side of the handlebars. In other words, two dual-sided brake hoods may be interchangeably installed on the right side and the left side of the handlebars, respectively. The dual-sided design allows for a single manufacturing tool, machining fixture, and assembly fixture to produce the brake hood. This reduces the manufacturing and qualification efforts due to only needing to focus on a single manufactured part or sub-assembly. Another benefit is that the dual-sided hood design may allow a user to configure the side of the hood from which the hydraulic hose extends. For example, a rider may prefer the hose to exit towards the center of the handlebars. As another example, a rider may prefer the hose to exit toward the outside of the handlebars. Both configurations may be provided with the same dual-sided brake hood; different parts for the right side or the left side of the handlebars, or for center hose routing or outside hose routing are unnecessary.

Figure 1:
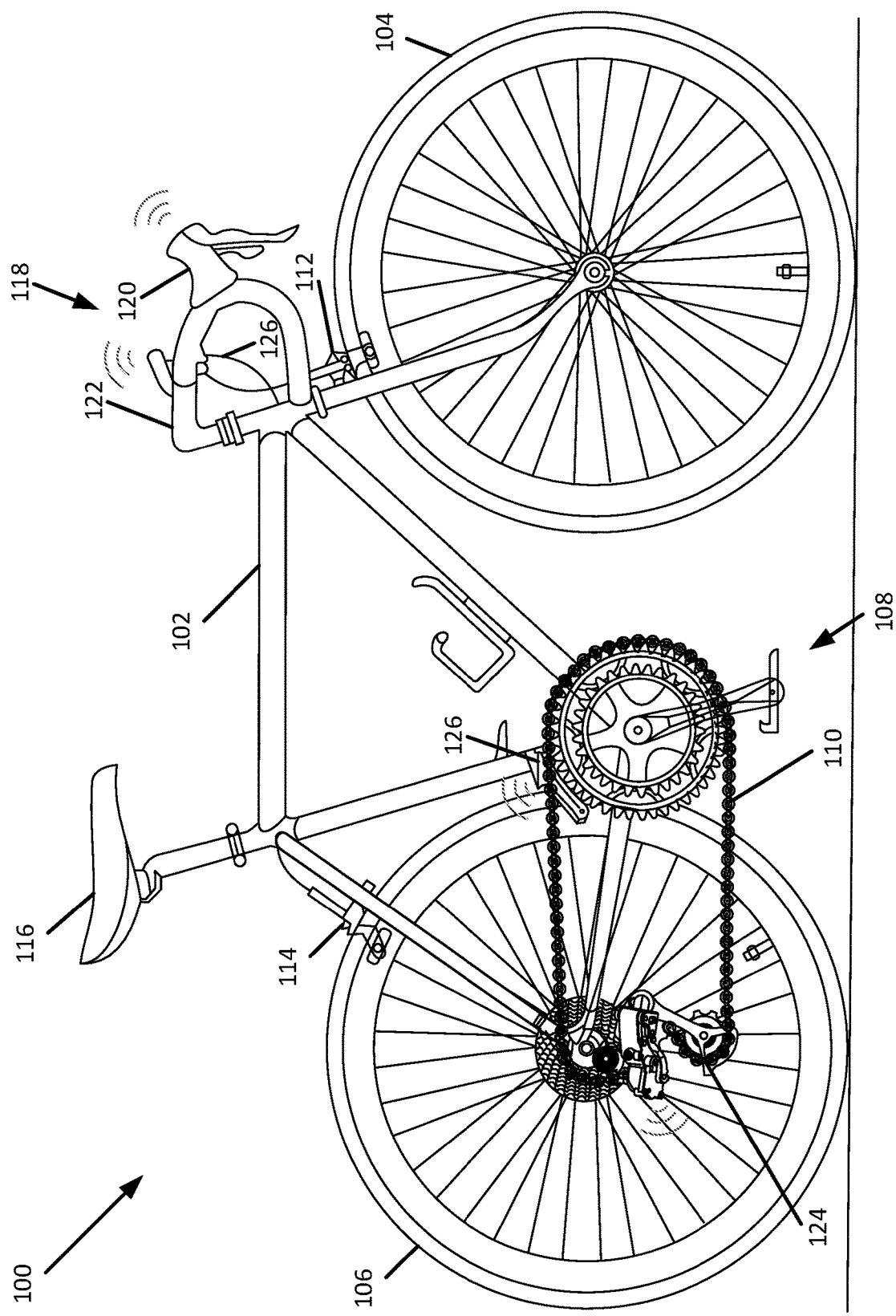
FIG. 1 is a side view schematic of a bicycle fitted with braking controls having a dual-sided housing in accordance with the teachings of this disclosure.

Turning now to the drawings, FIG. 1 generally illustrates one example of a bicycle 100 on which a dual-sided brake hood 120 of one or more of the present embodiments may be installed. In the example shown, the bicycle 100 is a road bicycle. The bicycle 100 has a frame 102 supported on a front wheel 104 and a rear wheel 106. A drivetrain 108 is arranged to provide power to the rear wheel 106 via a chain 110. A front brake 112 and a rear brake 114 are arranged to slow rotation of the front wheel 104 and the rear wheel 106, respectively. A saddle 116 is provided to support the rider during use of the bicycle 100. Further, a handlebar assembly 118 is arranged to control a direction of the front wheel 104 and communicate with the drivetrain 108, the front brake 112, and the rear brake 114 to control operation thereof.

It is to be understood that the specific arrangement and illustrated components of the frame 102, front wheel 104, rear wheel 106, drivetrain 108, front brake 112, rear brake 114, and saddle 116 are nonlimiting to the disclosed embodiments. For example, while the front brake 112 and the rear brake 114 are illustrated as hydraulic rim brakes, hydraulic disc brakes are contemplated and encompassed within the scope of the disclosure.

While the bicycle 100 depicted in FIG. 1 is a road bicycle, the dual-sided brake hood 120, including the specific embodiments and examples disclosed herein as well as alternative embodiments and examples, may be implemented on other types of bicycles. For example, the disclosed dual-sided brake hood 120 may be used on mountain bicycles.

The handlebar assembly 118 includes a handlebar 122 and one or more hoods 120. Typically, components supported by a hood 120 installed on a right side of the handlebar 122 controls operation of a rear derailleur 124 (e.g., part of the drivetrain 108) and the rear brake 114, while components supported by a hood 120 installed on a left side of the handlebar 122 controls a front derailleur 126 (e.g., part of the drivetrain 108) and the front brake 112. The derailleurs 124, 126 may be configured for wired or wireless operation. For example, the derailleurs may be configured to receive a gear shift signal from a remote shift control device or shift module. In addition to supporting components that control braking and shifting of the bicycle 100, the hoods 120 may support the weight of the rider riding the bicycle 100. The illustrated handlebar 122 is a drop-style handlebar. In other embodiments, different handlebar styles may be employed. For example, the handlebar 122 may be a bullhorn handlebar, a flat handlebar, a riser handlebar, or another type of handlebar. A center of the handlebar 122 may be defined by a line or axis extending along the length of the handlebar 122.

Figure 2:
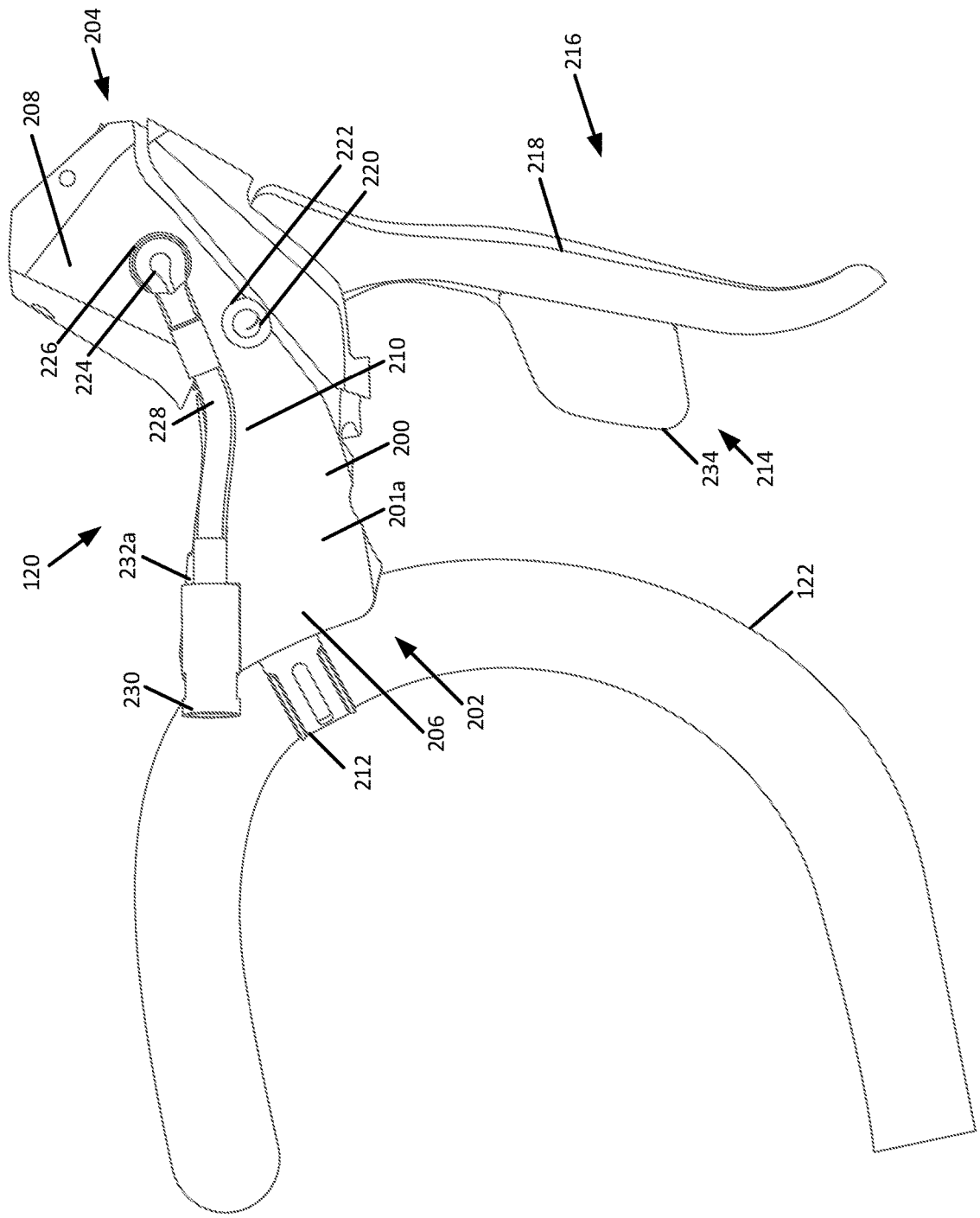
FIG. 2 is a side view of a brake controller having a dual-sided housing in accordance with the teachings of this disclosure, attached to a handlebar of a bicycle, such as the bicycle of FIG. 1.

Referring to FIG. 2, the dual-sided brake hood 120 is shown in greater detail. The dual-sided brake hood 120 is shown mounted on a right side of a handlebar 122. The dual-sided brake hood 120 includes a housing 200, a first end 202, a second end 204, a handlebar mounting portion 206 at the first end 202, a horn portion 208 at the second end 204, and a gripping portion 210 arranged between the handlebar mounting portion 206 and the horn portion 208.

The handlebar mounting portion 206 may support a clamp 212 for fastening the dual-sided brake hood 120 to the handlebar 122. For example, the clamp 212 may be supported by a recess (see FIGS. 9 and 10) in the first end 202 of the housing 200. The clamp 212 may be secured by a fastener (see FIGS. 5-7) disposed in the handlebar mounting portion 206. The clamp 212 may allow for the dual-sided brake hood 120 to be mounted on the right side or the left side of the handlebar 122. The clamp 212 may be a rigid clamp. For example, the clamp 212 may be made from metal, plastic, or another rigid material. The handlebar mounting portion 206 of the dual-sided brake hood 120 may be mounted to the handlebar 122 in any number of other ways including, for example, with one or more fasteners (e.g., nut-bolt combinations). In some cases, the clamp 212 may be arranged on or centered on an axis (e.g. an axis of symmetry) of the housing 200. The clamp 212 may be configured to fasten the brake hood 212 to the handlebar 122 such that the axis of the housing 200 is aligned with or intersects a central axis of the handlebar 122.

A shift lever 214 and a brake lever 216 are coupled to the dual-sided brake hood 120. The shift lever 214 includes an actuation surface 234. In some cases, the actuation surface 234 may be disposed on a side of the shift lever 214 facing the outside of the handlebars 122.

The brake lever 216 includes a hand engaging portion 218 that is pivotable about a pivot 220 (e.g., a pivot pin) supported by the dual-sided brake hood 120. For example, the brake lever 216 is pivotably coupled to the dual-sided brake hood 120 via the pivot pin 220 extending through one or more pivot apertures 222 in the dual-sided brake hood 120 and a corresponding aperture through the brake lever 216. The pivot pin 220 may support the brake lever 216 and allow for the brake lever 216 to move relative to the housing 200. For example, the brake lever 216 may move toward and away from the first end 202 and the second end 204 of the housing 200.

A shift control device 400 (see FIG. 4) and a brake control device (see FIG. 8) may be disposed within the housing 200 of the dual-sided brake hood 120. The shift lever 214 and the brake lever 216 interact with the shift control device 400 and the brake control device, respectively.

The shift control device 400 may be configured to initiate a gear shift based on an input from the shift lever 214. The shift lever 214 may be supported by the brake lever 216. The brake lever 216 may be configured to move toward and away from the first end 204 of the housing 200 and the shift lever 214 may move with the brake lever. Additionally, the shift lever 214 may be configured to rotate or pivot relative to the brake lever 216. For example, the shift lever 214 may move toward or away from the first side 201*a* and the second side 201*b* (e.g. side to side). In this way, the shift lever 214 may move substantially perpendicular to the brake lever 216.

In some cases, the shift control device 400 is an electronic shift control device. The shift control device 400 may include a power supply 402 and one or more circuit boards 404. The power supply 402 and one or more circuit boards 404 may be connected by one or more conductive paths 406. The power supply 402 may include a battery 408. For example, the battery 408 may be a model 2032 coin cell or button cell battery. The power supply 402 may be configured to provide power to components of the shift control device 400. For example, the power supply 402 may provide power to components directly connected to the power supply 402 or via the one or more conductive paths 406. Alternatively or additionally, the shift control device 400 may be powered by a power source outside of the dual-sided brake hood 120, elsewhere on or within the bicycle 100. The power supply 402 may serve as a connection, relay, or transformer for power received from a power source located outside of the dual-sided brake hood 120.

The conductive paths 406 may transmit electrical signals between components of the shift control device 400. The electrical signals may be power, data, or other signals. In some cases, the conductive paths 406 may transmit electrical signals between components of the shift control device 400 and other components of the bicycle 100. For example, the conductive paths 406 may transmit signals between the shift control device 400 and the front derailleur 126 or the rear derailleur 124. The conductive paths 406 may be wires or leads printed on a substrate. The conductive paths 406 may be made from metal or other conductive material.

The circuit board 404 may include a sensor 410, an antenna 412, a processor 414, and, in some cases, additional circuits. The sensor 410 may be configured to sense a particular motion at the shift lever 214 (e.g., rotation of the shift lever 214 relative to the brake lever 216 in a predetermined direction) and generate a signal for the shift control device 400 in response to the sensed motion. For example, the sensor 410 may detect a movement of the shift lever 214 and the shift control device 400 may send an electronic gear shift signal to an electronic shifter at the front derailleur 126 or the rear derailleur 124 of the bicycle 100. The sensor may be a gyroscope, a force sensor, or another sensor configured to detect movement. In some cases, the antenna 412 may be configured to transmit the gear shift signal. In one embodiment, the processor 414 may be in communication with the sensor configured to form the electronic gear shift signal based on input received from the sensor 410. The processor may be configured to transmit the gear shift signal via the antenna 412 or the conductive path 406. The processor 414 may be a general processor, an application specific integrated circuit, or another machine. In some cases, the antenna 412 may be disposed on or within the actuation surface 234, the shift lever 214, or the body 200 of the dual-sided brake hood 120. In some other cases, the antenna 412 may be omitted and the electronic gear shift signal may be transmitted via the one or more conductive paths 406.

The brake control device may be configured to actuate a brake of the bicycle 100. Depending on which side of the handlebar 122 the brake control device is installed, the brake control device may be configured to control the front brake 112 or the rear brake 114 of the bicycle 100. In response to movement of the brake lever 216, the brake control device may push fluid out of the dual-sided brake hood 120 and through a banjo fitting 224, a flexible tube 228, and a hydraulic fitting 230 to the front brake 112 or the rear brake 114.

The banjo fitting 224 may be disposed in a banjo aperture 226 in the housing 200 of the dual-sided brake hood 120. The banjo aperture 226 may be a recess in the housing 200. The recess of the banjo aperture 226 may connect, intersect, or otherwise share a profile with one or more the exit paths 232*a*, 232*b*. The exit paths 232*a*, 232*b* may be hydraulic line paths configured to accommodate a hydraulic line. For example, the exit paths 232*a*, 232*b* may accommodate one or more of the banjo fitting 224, the flexible tube 228, and the hydraulic fitting 230. In some cases, the banjo aperture 226 may extend through the housing 200 and intersect or connect to both the first exit path 232*a* and the second exit path 232*b*.

The banjo fitting 224 may have an internal annular space in fluid communication with the brake control device and the flexible tube 228. The flexible tube 228 may fluidly connect the banjo fitting 224 to the hydraulic fitting 230 arranged to couple the flexible tube 228, and thus components supported by the dual-sided brake hood 120, to the front brake 112 or the rear brake 114 via hydraulic tubing on the bicycle 100. In some cases, the flexible tube may be a hydraulic line.

The housing 200 may be made from plastic, metal, or another material. In some cases, the housing 200 may be manufactured with plastic injection molding. In some other cases, the housing 200 may be made from aluminum. The housing 200 may be forged, cast, milled, or manufactured with another process.

The housing 200 of the dual-sided brake hood 120 may define one or more hydraulic line exit paths 232*a*, 232*b*. The exit paths 232*a*, 232*b* may extend from the banjo aperture 226 to the first end 202 of the housing 200. Each of the exit paths 232a, 232b may extend substantially along one side of the housing 200. For example, a first exit path 232a may be disposed on a first side 201a of the housing 200 of the dual-sided brake hood 120 (e.g., a right side of the housing 200 of the dual-sided brake hood 120 when the dual-sided brake hood 120 is installed on the handlebar 122), and a second exit path 232b may be disposed on a second side 201b of the housing 200 (e.g., a left side of the housing 200 of the dual-sided brake hood 120 when the dual-sided brake hood 120 is installed on the handlebar 122), opposite the first exit path 232a. The first exit path 232a and the second exit path 232b may be substantially symmetric. In this way, the dual-sided brake hood having first exit path 232a and the second exit path 232b may allow for the banjo fitting 224, the flexible tube 228, and the hydraulic fitting 230 to be routed along or within either exit path, 232a, 232b. Though the right side dual-sided brake hood 120 of FIG. 2 shows the banjo fitting 224, the flexible tube 228, and the hydraulic fitting 230 arranged in the exit path 232a on the first side 201a of the housing 200 of the dual-sided brake hood 120 (e.g. facing away from a center of the bicycle 100), the dual-sided brake hood 120 includes an exit path 232b on the second side 201b of the housing 200 of the dual-sided brake hood 120 (e.g. facing the center of the bicycle 100). The banjo fitting 224, the flexible tube 228, and the hydraulic fitting 230 may be arranged in the exit path 232b on the second side 201b of the housing 200 of the dual-sided brake hood 120, thereby allowing the dual-sided brake hood 120 to be mounted on the right side or the left side of the handlebar 122. The dual exit paths 232a, 232b also allow for central or outside routing of the banjo fitting 224, flexible tube 228, and hydraulic fitting 230.

In some cases, the exit path 232a, 232b may be a recess in the housing 200. The recess in the exit paths 232a, 232b may reduce an extent to which the banjo fitting 224, the flexible tube 228, and the hydraulic fitting 230 protrude from a surface of the housing 200 of the dual-sided brake hood 120. The recess in the exit path 232a, 232b may allow for a smooth and ergonomic outer surface to be presented to the rider when a grip is fitted over the hood 120.

A grip cover may be installed over at least the gripping portion 210 and the horn portion 208 of the housing 200 of the dual-sided brake hood 120 to provide a cushion or an ergonomic gripping surface for a user. The grip cover may be made from a stretchable or flexible material. For example, the grip cover may be made from rubber or silicone. The grip cover may be removable to provide access to the components of the dual-sided brake hood 120.

Figure 3:
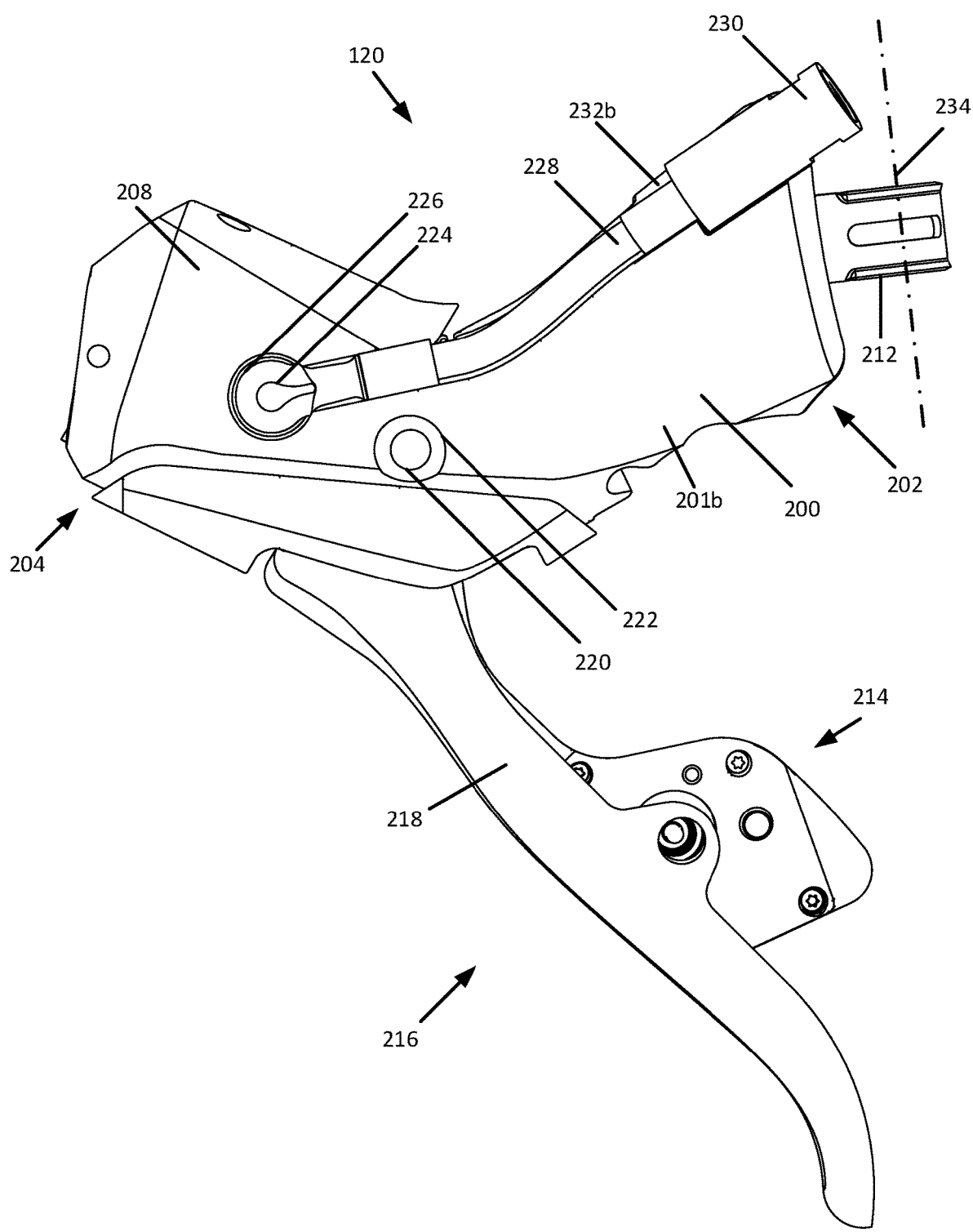
FIG. 3 is a first side view of the brake controller of FIG. 2.
Figure 4:
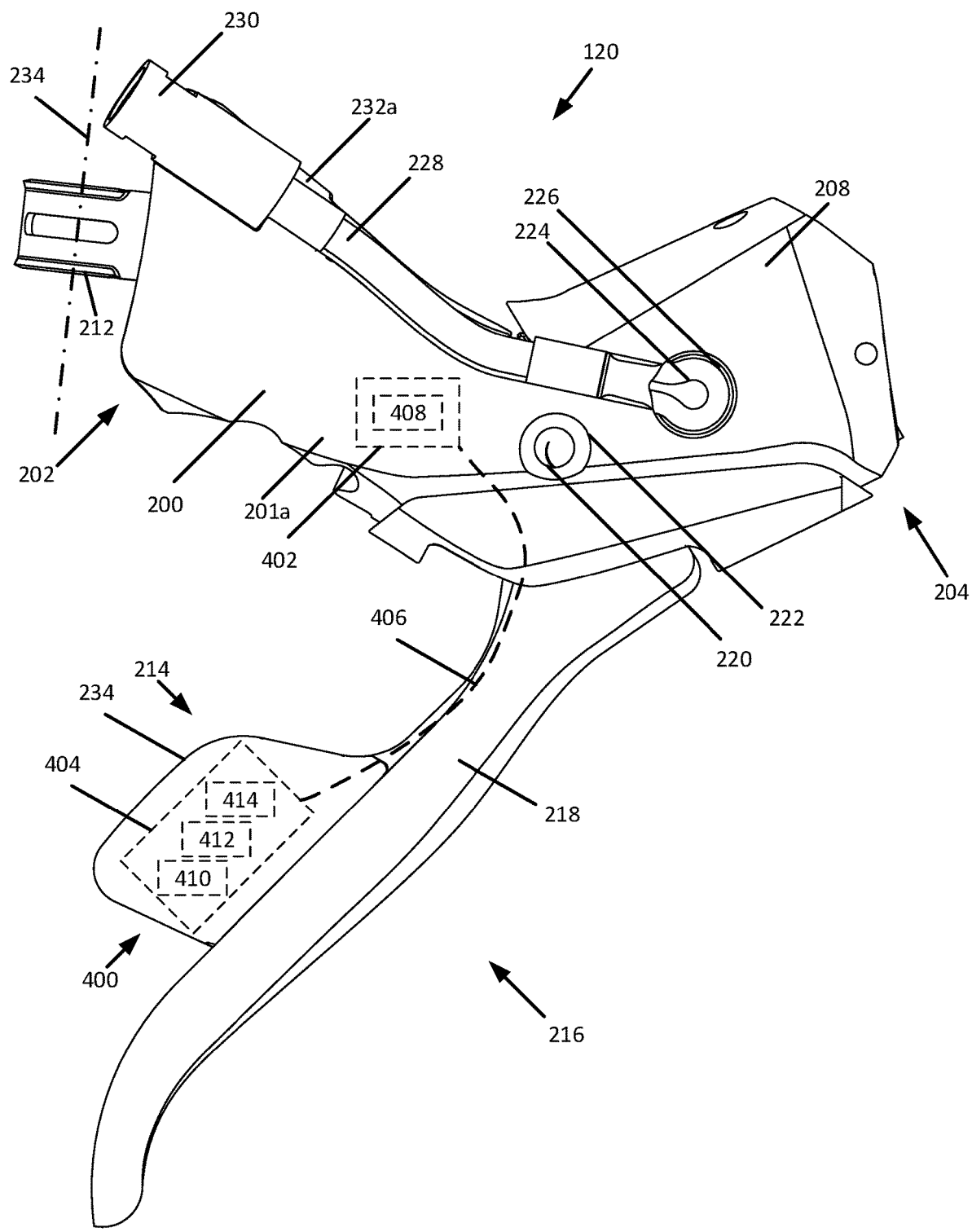
FIG. 4 is a second side view of the brake controller of FIG. 2.

Referring to FIGS. 3 and 4, the dual-sided brake hood 120 is shown detached from the handlebar 122. Both the right side 201a and the left side 201b of the housing 200 may include a banjo aperture 226 and an exit path 232a, 232b. In FIG. 3, the banjo fitting 224, the flexible tube 228, and the hydraulic fitting 230 are disposed in the exit path 232b along the left side 201b of the housing 200 of the dual-sided brake hood 120, while in FIG. 4, the banjo fitting 224, the flexible tube 228, and the hydraulic fitting 230 are disposed in the exit path 232a along the right side 201a of the housing 200 of the dual-sided brake hood 120. The routing of the flexible tube 228 and the hydraulic fitting 230 may be changed from one side to another (e.g. from exiting along the left side 201b of the housing 200 to exiting along the right side 201a of the housing 200, and vice-versa) by reversing the orientation of the banjo fitting 224.

Figure 5:
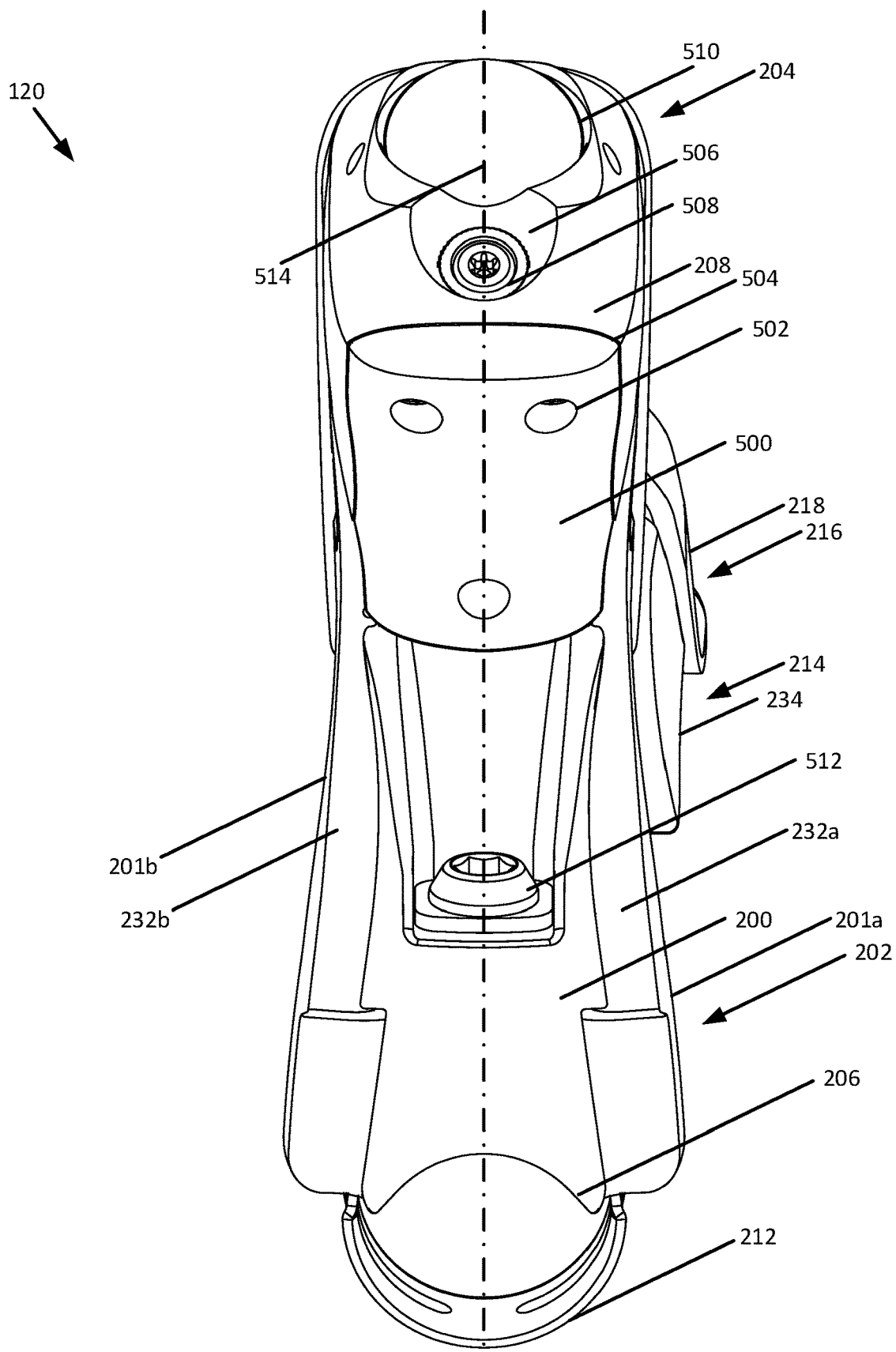
FIG. 5 is a top-down view of the brake controller of FIG. 2 without a brake line installed.
Figure 6:
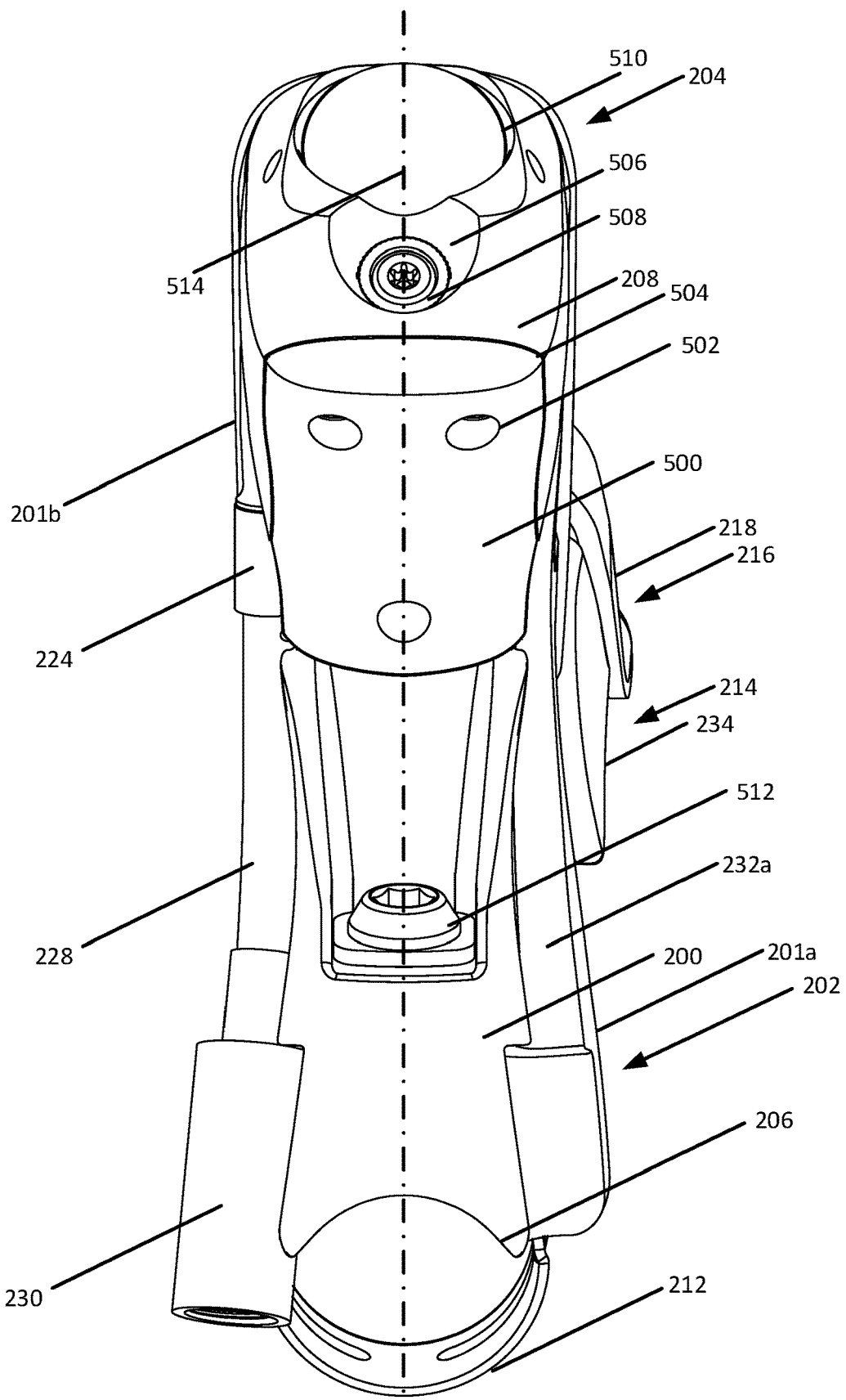
FIG. 6 is a top-down of the brake controller of FIG. 2 with a brake line installed at a first side of the dual-sided housing.
Figure 7:
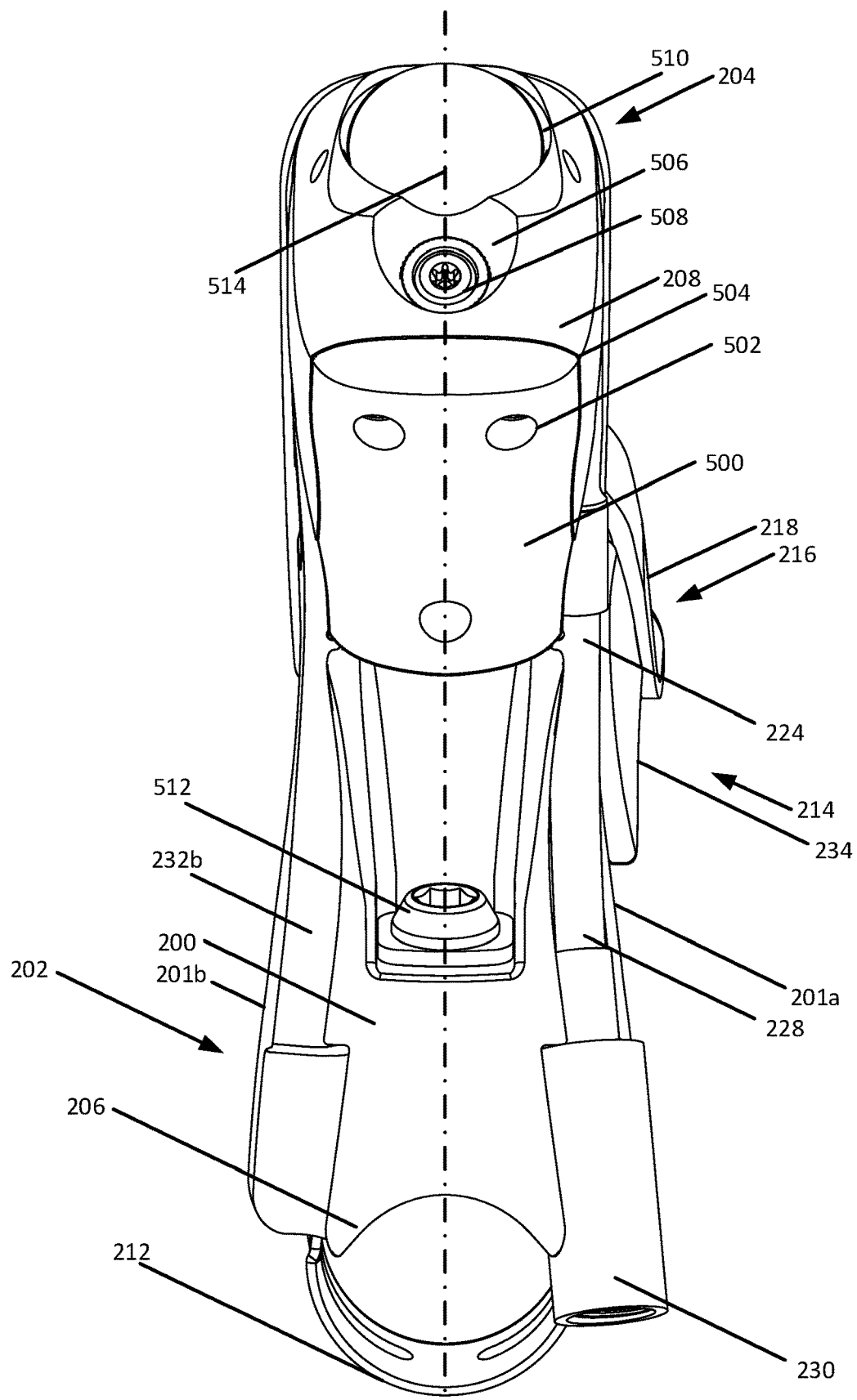
FIG. 7 is a top-down of the brake controller of FIG. 2 with a brake line installed at a second side of the dual-sided housing.

Referring to FIGS. 5, 6, and 7, the dual-sided brake hood 120 is shown in a top down view and is detached from the handlebar 122. An axis of symmetry 514 running along the length of the brake hood 120 is shown. In some cases, the axis of symmetry is the same as the axis 906 shown in FIGS. 9 and 10. In FIG. 5, the banjo fitting 224, the flexible tube 228, and the hydraulic fitting 230 are removed, revealing a first exit path 232a on the first side 201a and a second exit path 232b on the second side 201b. The exit paths 232a, 232b may be hydraulic line paths configured to accommodate a hydraulic line. The exit paths 232a, 232b may be disposed on either side of the axis 514. For example, the exit paths 232a, 232b may be disposed symmetrically on either side of the axis 514. In FIG. 6, the banjo fitting 224, the flexible tube 228, and the hydraulic fitting 230 are disposed in the second exit path 232b along the left side 201b of the housing 200 of the dual-sided brake hood 120, and in FIG. 7, the banjo fitting 224, the flexible tube 228, and the hydraulic fitting 230 are disposed in the first exit path 232a along the right side 201a of the housing 200 of the dual-sided brake hood 120.

A reservoir cap 500 may be secured to the housing 200 of the dual-sided brake hood 120 by fasteners fitted through one or more fastening apertures 502 in the reservoir cap 500. The fastening apertures 502 may, for example, be threaded apertures. For example, screws or bolts may be inserted into the fastening apertures 502 to secure the reservoir cap 500 to the housing 200. The reservoir cap 500 may cover a diaphragm aperture 504. In some cases, an inner surface of the reservoir cap 500 may define a boundary of the diaphragm aperture 504. The reservoir cap 500 may be centered in one or more dimensions on the axis 514. For example, a width of reservoir cap may be centered on the axis 514.

A reservoir aperture 506 may be present in the housing 200 of the dual-sided brake hood 120. A reservoir plug 508 may be disposed in the reservoir aperture 506. The reservoir plug 508 may be centered on the axis 514. The reservoir aperture 506 and the diaphragm aperture 504 may open into a reservoir disposed in the housing 200 of the of the dual-sided brake hood 120 (see FIG. 8). The reservoir plug 508 may be threadedly engaged with the reservoir aperture 506 such that when the reservoir plug 508 is threaded into the reservoir aperture 506, the reservoir 830 is effectively sealed, and when the reservoir plug 508 is removed, communication is provided between the reservoir and the ambient air. With the reservoir plug 508 removed, hydraulic fluid may be added to the reservoir. Additionally or alternatively, air may be bled from a hydraulic brake system of the bicycle with the reservoir plug 508 removed. The reservoir aperture 506 may function as a bleed and/or fill port for the hydraulic system. The housing 200 may further define a master cylinder aperture 510. The master cylinder aperture 510 may be in fluid communication with the banjo aperture 226.

A clamp tensioning element 512 may be disposed in the housing 200 of the dual-sided brake hood 120. The clamp tensioning element 512 may be centered on the axis 514. In some cases, the clamp tensioning element 512 may be a bolt extending through the housing and mechanically engaged with the clamp 212. The clamp 212 may be centered on the axis 514. The clamp tensioning element 512 may have a hex interface on one end. Rotation of the clamp tensioning element 512 may increase or decrease tension applied by the clamp 212. For example, the clamp tensioning element 512 may be rotated in one direction to reduce the tension in the clamp 212. With the tension relieved, the dual-sided brake hood 120 may be mounted on the bicycle 100. For example, a part of the handlebar 122 may be fed through the clamp 212 until the dual-sided brake hood 120 is in place. Once the hood 120 is in the desired location, the clamp tensioning element 512 may be rotated to increase the tension applied by the clamp 212 and to secure the dual-sided brake hood 120 in place.

Though FIG. 5 shows the banjo fitting 224, the flexible tube 228, and the hydraulic fitting 230 are removed, those components may be installed relative to the location of the actuation surface 234 of the shift lever 214. For example, FIG. 6 shows the banjo fitting 224, the flexible tube 228, and the hydraulic fitting 230 installed on a side of the housing 200 opposite the actuation surface 234. In FIG. 7, the banjo fitting 224, the flexible tube 228, and the hydraulic fitting 230 are installed on the same side of the housing 200 as the actuation surface 234. Though FIGS. 5, 6, and 7 show the actuation surface 234 located to a right side of the housing 200, the actuation surface 234 may be located to a left side of the housing 200.

Figure 8:
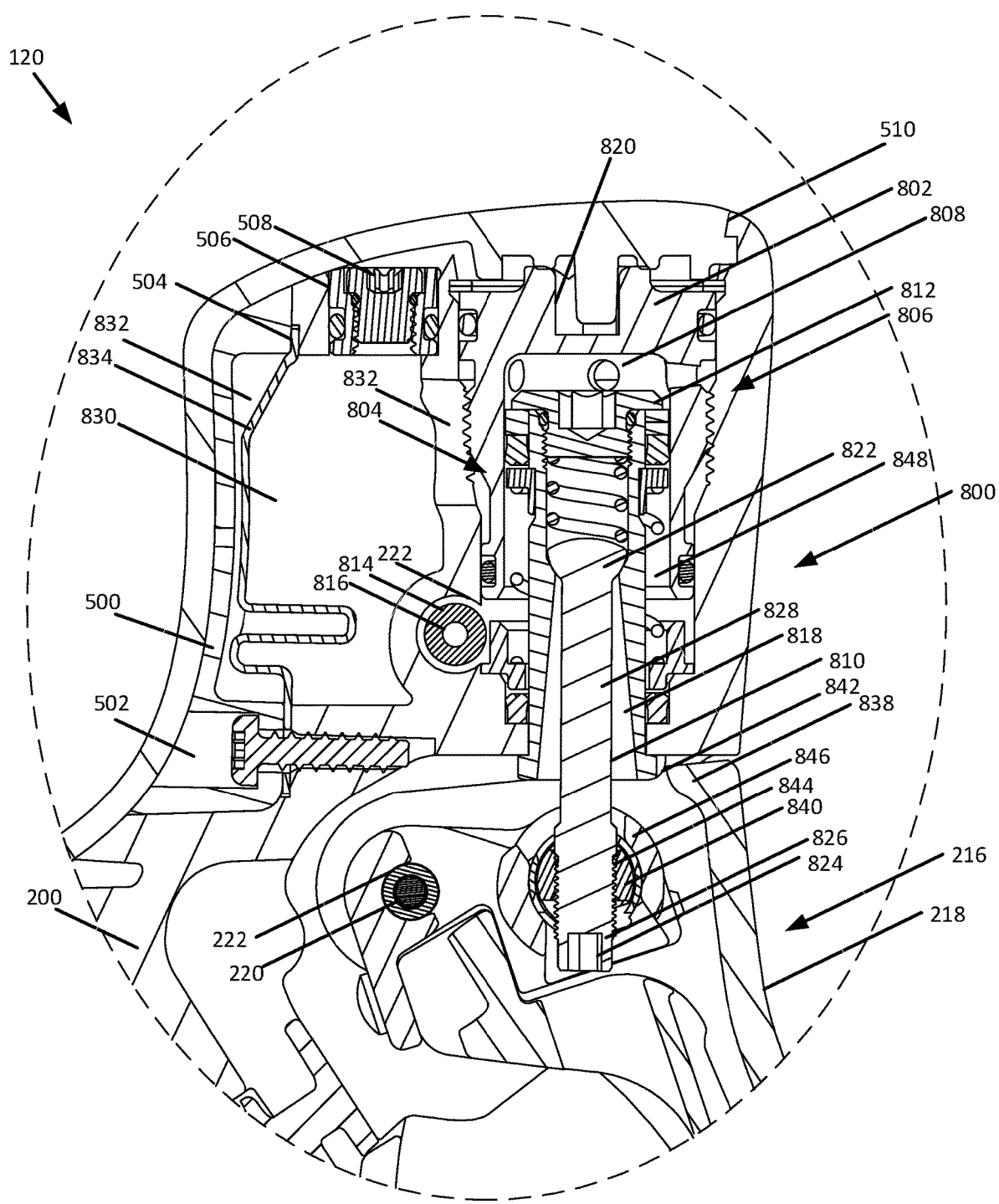
FIG. 8 is a cross-sectional view of the brake controller of FIG. 2.

Referring to FIG. 8, the horn portion 208 of the dual-sided brake hood 120 is shown in cross section. The dual-sided brake hood includes a brake control device 800. The brake control device 800 includes a master cylinder sleeve 802 that is received within the master cylinder aperture 510. A piston assembly 804 may be disposed within the master cylinder sleeve 802. In this way, the piston assembly 804 may be disposed within the horn portion 208 of the dual-sided brake hood 120. An adjuster 806 may adjust a position of the master cylinder sleeve 802 relative to the piston assembly 804. The piston assembly 804 may include a piston 808 and a piston rod 810. The piston 808 may include a piston cap 812 received by the master cylinder sleeve 802 and a piston body 818 coupled to the piston cap 812. An outlet tube 814 defining an outlet passageway 816 may be in fluid communication with the master cylinder sleeve 802.

Movement of the piston 808 may change a pressure in a piston pressure chamber 848 disposed inside the master cylinder aperture 510. The piston pressure chamber 848 may be in fluid communication with the master cylinder sleeve 802, the outlet tube 814, and the outlet passageway 816. For example, one or more ports in the maser cylinder aperture 510 may provide fluid communication between the piston pressure chamber 848 and the outlet tube 814 and passageway 816. In another example, one or more ports in the master cylinder sleeve 802 may provide fluid communication between the fluid reservoir 830 and the piston pressure chamber 848, the outlet tube 814, and the outlet passageway 816. In this way, the outlet tube 814 may be connected to a hydraulic on either side of the housing 200 and remain in fluid communication with the fluid reservoir 830, the piston pressure chamber 848, and other components of the horn 208. Actuation of the brake lever 216 may apply pressure to the front brake 112 or rear brake 114 by forcing fluid out of the piston pressure chamber 848, through the outlet passageway 816 and outlet tube 814, and to one or more hydraulic lines.

The adjuster 806 may include threads on the master cylinder sleeve 802 sized to threadingly engage surfaces defining the master cylinder aperture 510 of the housing 200 of the dual-sided brake hood 120. In some cases, the adjuster 806 may be any feature or device that allows the master cylinder sleeve 802 to be adjusted relative to the position of the piston assembly 804. The master cylinder sleeve 802 includes a hex key recess 820 arranged to receive a hex key. The master cylinder sleeve 802 may include recesses arranged to receive one or more seals, compensation ports, and timing ports.

The piston rod 810 may include a piston engaging portion on a first end 822 and a hex key recess 824 on a second end 826 opposite the first end 822. A shaft 828 may extend between the first end 822 and the second end 826. A portion of the shaft 828 may be threaded and arranged to threadedly engage with the brake lever 216.

The diaphragm aperture 504 and the reservoir aperture 506 open into a reservoir 830. The reservoir 830 may be a reservoir for hydraulic fluid. An internal aperture 832 provides fluid communication between the reservoir 830 and the master cylinder sleeve 802. For example, the internal aperture 832 may provide fluid communication between the reservoir 830 and one or more compensation or timing ports of the master cylinder sleeve 802. The compensation or timing ports in the master cylinder sleeve 802 may provide for fluid communication between the reservoir 830 and an interior of the master cylinder aperture 510. A flexible diaphragm 834 may be disposed between the surface or surfaces defining the diaphragm aperture 504 and a reservoir cap 500 such that an air space 836 is separated from the reservoir 830. A reservoir plug 508 is threadingly engaged with one or more surfaces defining the reservoir aperture 506 such that when the reservoir plug 508 is threaded into the reservoir aperture 506, the reservoir 830 is effectively sealed, and when the reservoir plug 508 is removed, communication is provided between the reservoir 830 and the ambient air.

The brake lever 216 includes the hand engaging portion 218, a top wall 838, the pivot 220, and a brake engaging element 840. In some cases, the brake engaging element 840 may be a captured ball. A lever aperture 842 in the top wall 838 of the brake lever 216 allows for the shaft 828 of the piston rod 810 to pass through to an interior portion of the brake lever 216. The pivot 220 is sized to be received into the pivot aperture 222 such that brake lever 216 is supported for rotation relative to the housing 200. The brake engaging element 840 defines a threaded reach aperture 844. The threaded reach aperture 844 may be sized to threadingly receive a threaded portion of the shaft 828 of the piston rod 810. The brake engaging element may be supported by a bracket 846 disposed in the brake lever 216. In this way, the brake lever 216 is operatively coupled to the piston 808. Movement of the brake lever 216 may cause the piston 808 to be moved from a rest position within the master cylinder sleeve 802 to an actuated position. Moving the piston 808 to the actuated position may cause fluid to flow out of the master cylinder aperture 510 and through the outlet tube 814, the banjo fitting 224, the flexible tube 228, and the hydraulic fitting 230. The fluid flow may cause the front brake 114 or the rear brake 114 to actuate.

Figure 9:
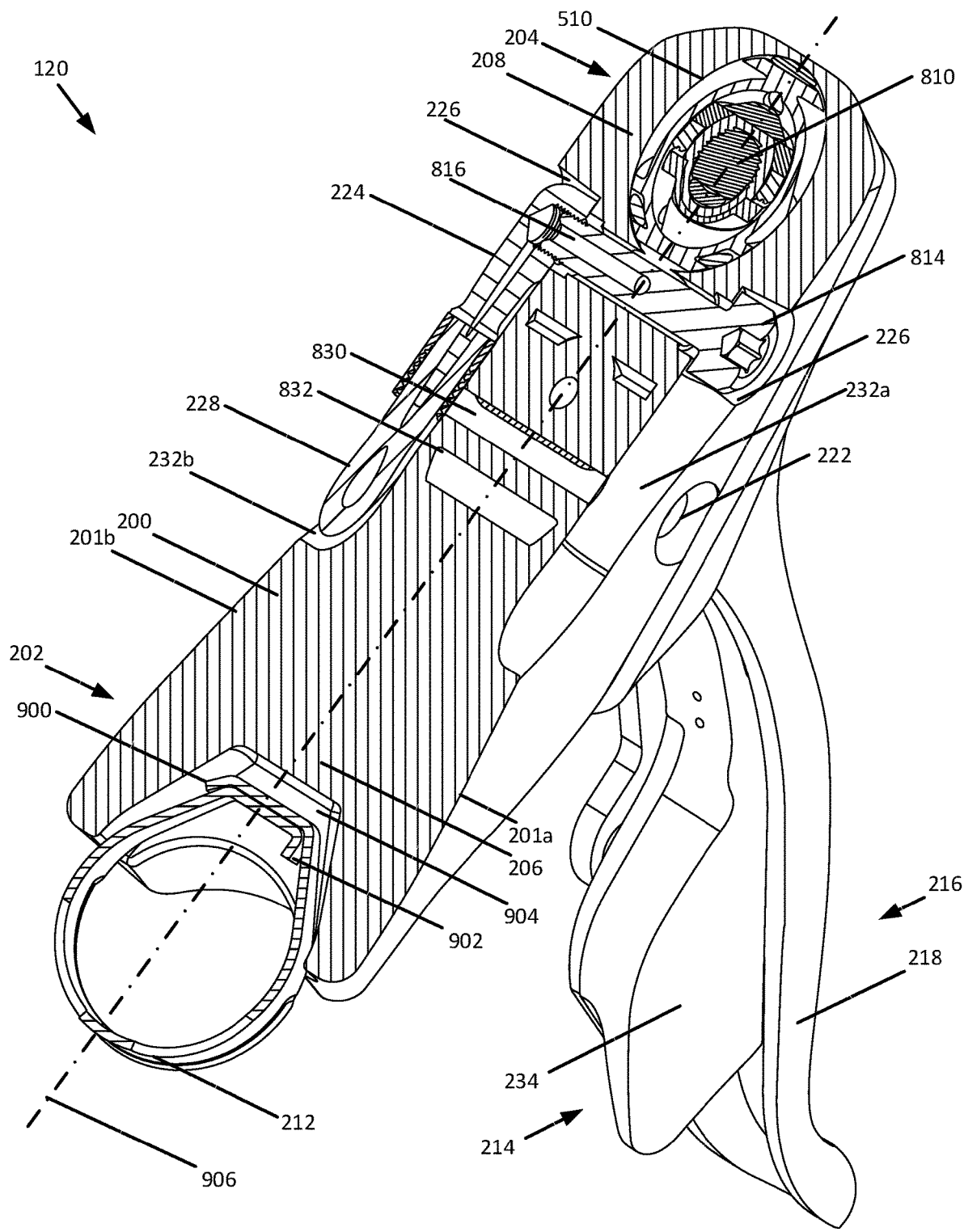
FIG. 9 is a cross-sectional view of the brake controller of FIG. 6.
Figure 10:
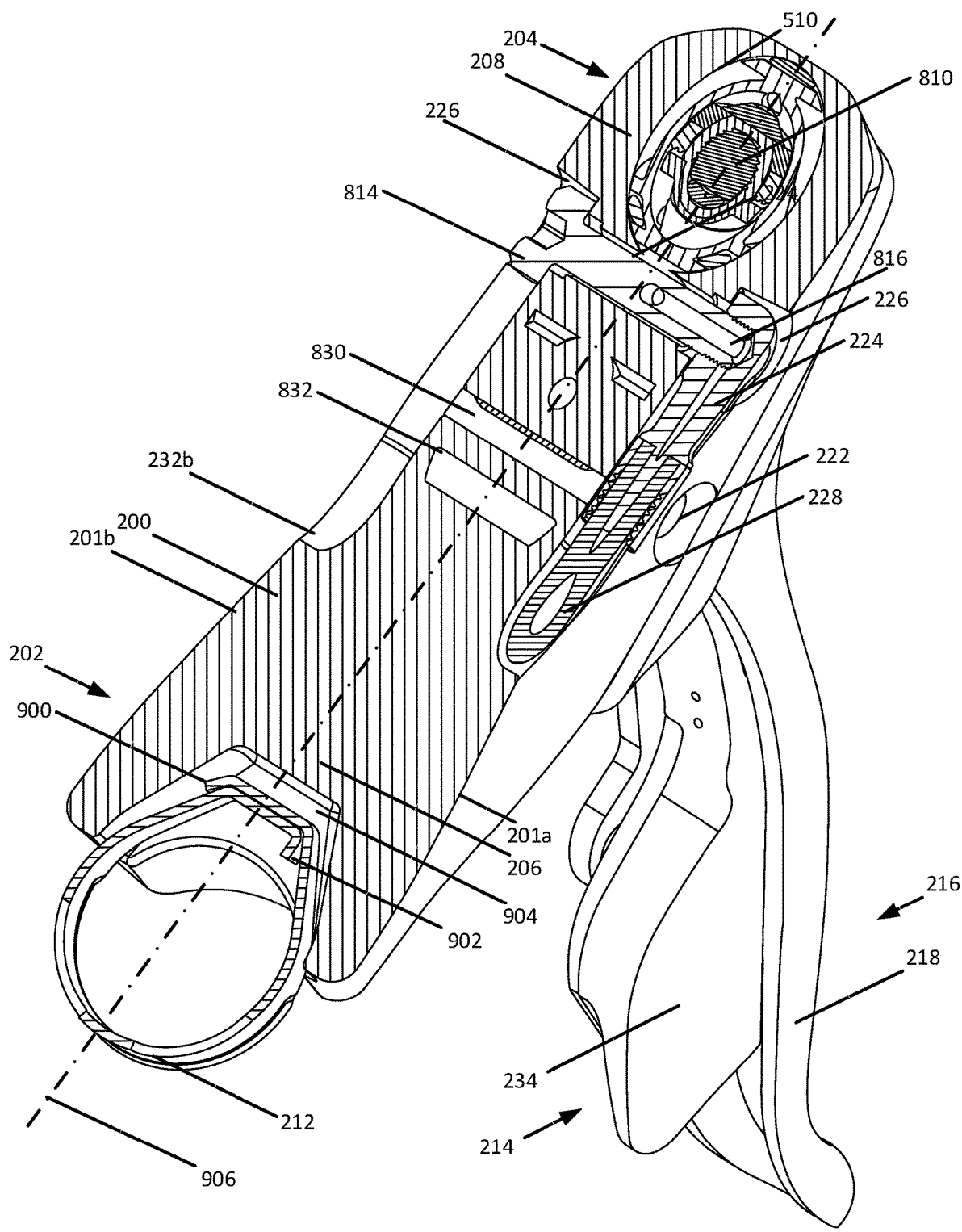
FIG. 10 is a cross-sectional view of the brake controller of FIG. 7.

Referring to FIGS. 9 and 10, a cross section of the dual-sided brake hood 120 is shown. The clamp 212 may have a first end 900 and a second end 902 disposed in a clamp recess 904 in the housing 200. The first end 900 and the second end 902 may be threadedly engaged with the clamp tensioning element 512 (see FIGS. 5-7). Rotation of the clamp tensioning element may draw the first end 900 and the second end 902 closer to the housing 200, or, alternatively, push the first end 900 and the second end 902 further away from the housing. The first end 900 and the second end 902 may be shaped such that when the ends 900, 902 are drawn into the clamp recess 904, the ends 900, 902 are pushed past one another, thereby effectively reducing the area open in the center of the clamp 212. By reducing the area, the clamp applies greater tension to any element disposed within the clamp. For example, the clamp 212 may apply greater tension to a handlebar 122. The first end 900 and the second end 902 may be shaped such that when the ends 900, 902 are out of the clamp recess 904, the ends 900, 902 are pushed past one another, thereby effectively increasing the area open in the center of the clamp 212 and reducing any tension applied by the clamp 212. To facilitate mounting the dual-sided brake hood 120 on either side of a handlebar 122, the clamp 212 may be located in the center of the first end 202 of the housing 200. In some cases, the clamp may be aligned with an axis of symmetry 906 dividing the housing 200 along a length. The axis of symmetry 906 may extend from the first end 202 to the second end 204. The clamp 212 may be centered or otherwise disposed on the axis of symmetry 906 of the housing 200. In some cases, the axis of symmetry 906 may be the same as the axis 514 shown in FIGS. 5-7.

A plane of symmetry may bisect the housing 200. The plane of symmetry may be located such that the axis of symmetry 906 and an axis extending through the piston 808 or the master cylinder aperture 510 reside within the plane of symmetry. The plane of symmetry may divide the housing 200 into two sides. For example, the hydraulic line exit paths 232a, 232b and components of the hydraulic line, such as the banjo fitting 224, the flexible tube 228, and the hydraulic fitting 230, may be disposed on the housing on either side or both sides of the plane of symmetry.

The outlet tube 814 may be sized to be received within the banjo aperture 226 such that the outlet tube 814 is arranged substantially perpendicular to the housing 200 of the dual-sided brake hood 120. The outlet tube 814 may be arranged to receive the banjo fitting 224 on one end, such that there is fluid communication between the master cylinder aperture 510, the outlet passageway 816, and the banjo fitting 224. Via the banjo fitting 224, the outlet tube may interface with the flexible tube 228. Though a one-piece outlet tube 814 is shown, the outlet tube 814 may be composed of two or more pieces. For example, the outlet tube may have a removable cap installed on one end to seal or close the outlet passageway. The flexible tube 228 may fluidly connect the banjo fitting 224 to the hydraulic fitting 230 (see FIGS. 2-4). The hydraulic fitting 230 may be arranged to couple the flexible tube 228 to hydraulic tubing of the bicycle 100. The profile of the banjo aperture 226 may be shaped to allow for the outlet tube 814 to be installed on the right side 201a or the left side 201b of the housing 200 (corresponding to routing the flexible tube 228 on the left side 201b and the right side 201a of the housing 200, respectively). For example, a single dual-sided brake hood 120 may support routing the flexible tube 228 on the right side 201a or the left side 201b depending on how the outlet tube 814 is installed in the housing 200 of the dual-sided brake hood 120. By threadedly engaging with the banjo fitting, the outlet tube 814 may secure the banjo fitting 224 and the flexible tube 228 in the housing 200.

Figure 11:
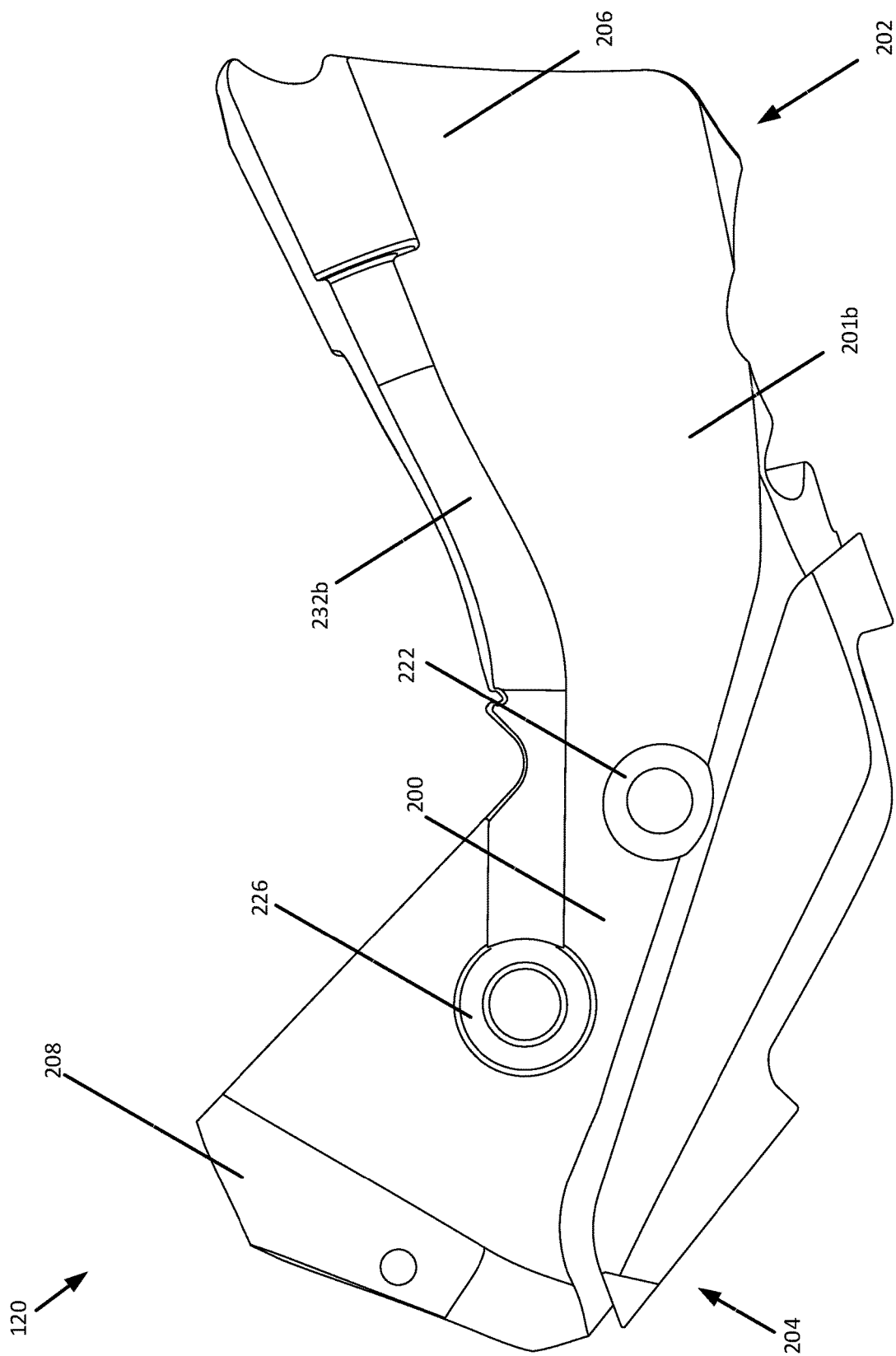
FIG. 11 is a side view of a housing of the dual-sided housing of FIGS. 2-10.
Figure 12:
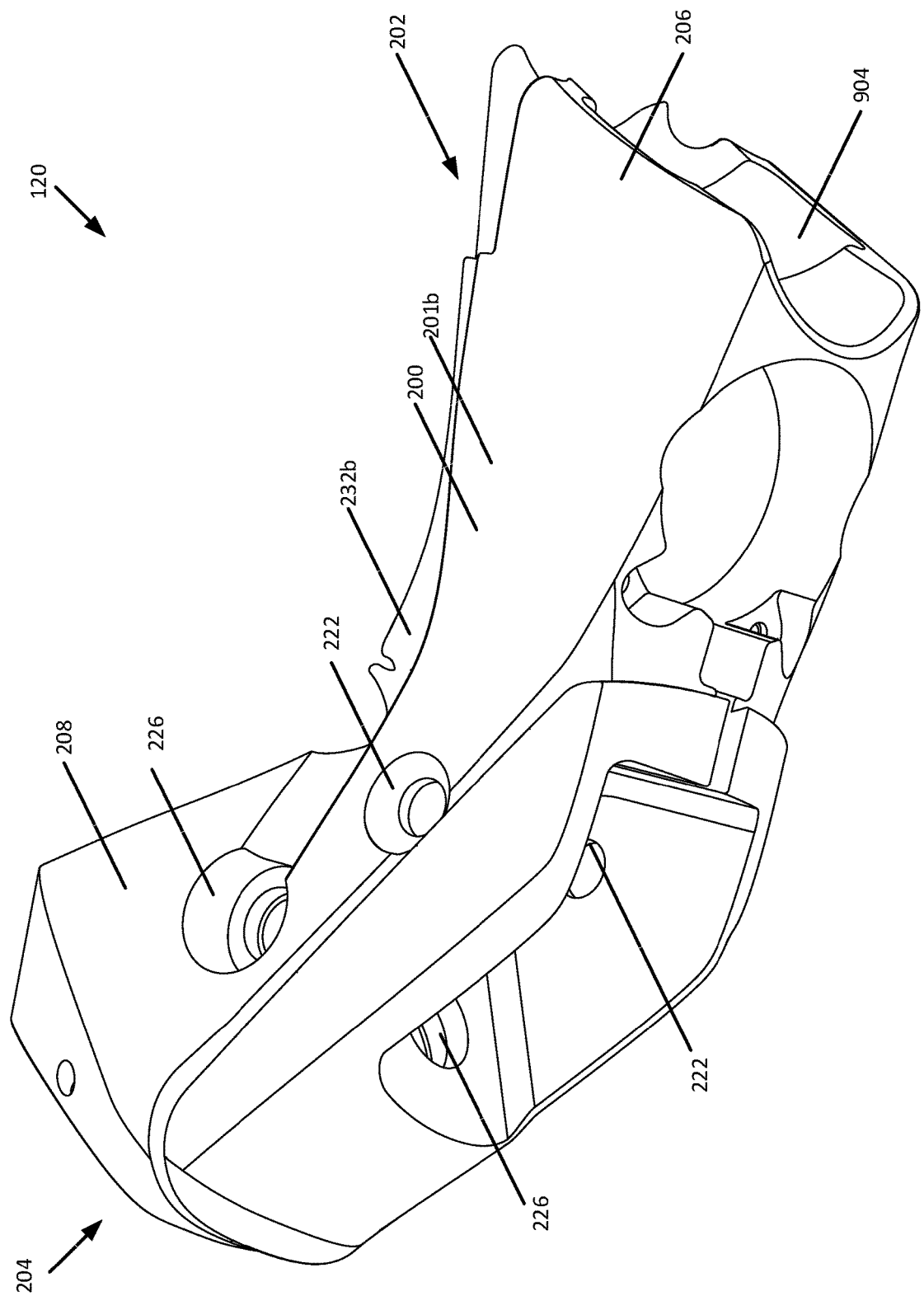
FIG. 12 is a first perspective view of the housing of the dual-sided housing of FIG. 11.
Figure 13:
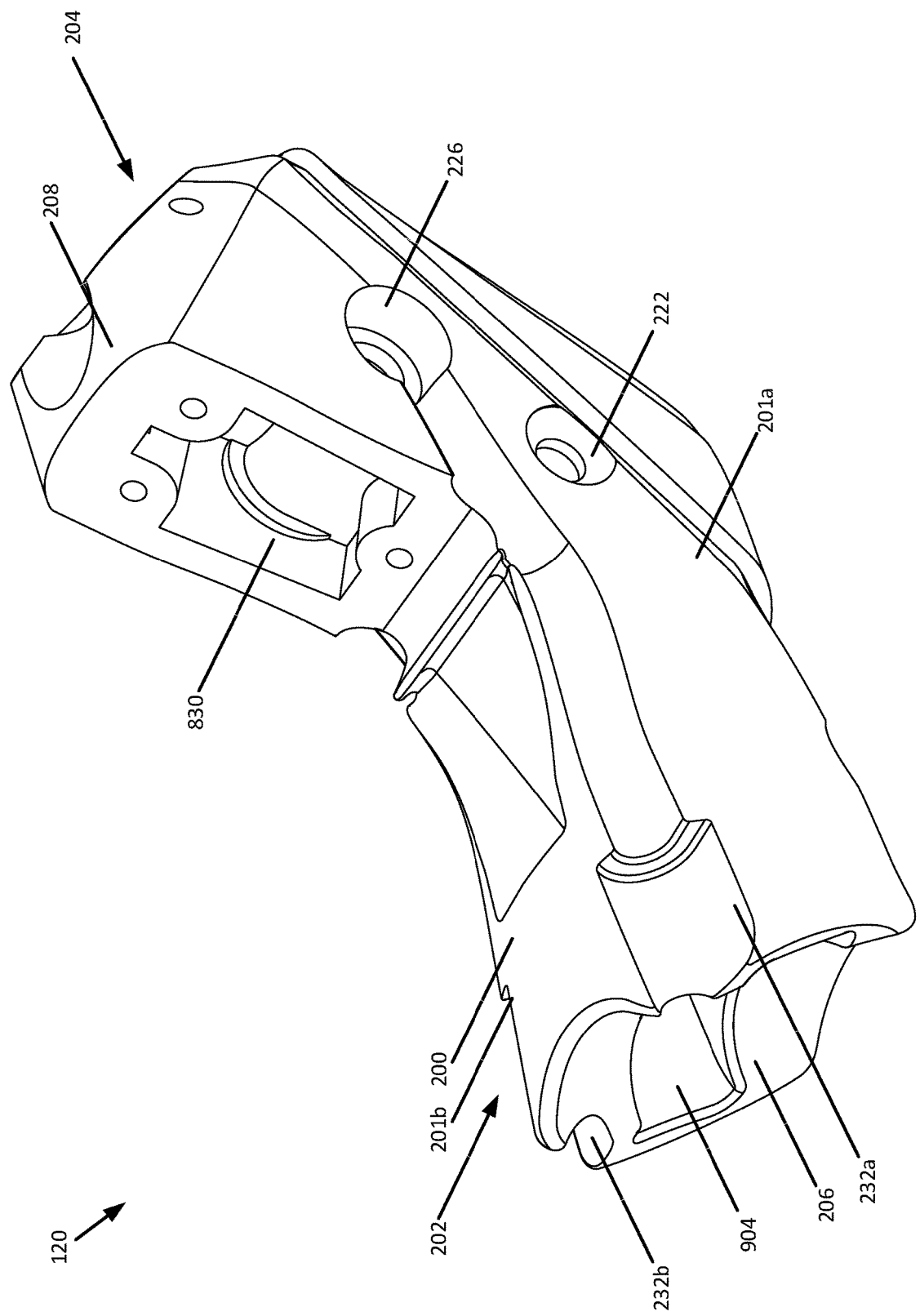
FIG. 13 is a second perspective view of the housing of the dual-sided housing of FIG. 11.

Referring to FIGS. 11, 12, and 13, the housing 200 of the dual-sided brake hood 120. More specifically, FIGS. 11, 12, and 13 together illustrate the dual exit paths 232a, 232b, the reservoir 830, and the clamp recess 904. The dual-sided brake hood 120 may be substantially symmetric along an axis extending from the first end 202 to the second end 204. The axis may be the axis of symmetry 906. In some cases, the outer profile of the housing 200 is symmetric along the axis. For example, each of the two exit paths 232a, 232b may be mirrored across the axis. In another example, the banjo apertures 222 in the right side 201a and the left side 201b of the housing 200 of the dual-sided brake hood 120 may be mirrored across the axis. In this way, a single brake hood 120 may be designed to be mounted on the right side 201a or the left side 201b of the handlebar 122 of the bicycle 100 and may support central or outside routing of the flexible tube 228.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, a mechanical shift control device may be substituted for the disclosed electronic shift control device. In another example, a mechanical brake control device may be substituted for the disclosed hydraulic brake control device. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A hydraulic brake control device comprising:
   a housing having a first side, a second side, and an end, the second side being opposite the first side, wherein the housing comprises:
   a first hydraulic line path and a second hydraulic line path, the first hydraulic line path including a first recess at the first side of the housing and the second hydraulic line path including a second recess at the second side of the housing,
   wherein the first recess extends along the first side of the housing, towards the end of the housing, and the second recess extends along the second side of the housing, towards the end of the housing, such that a hydraulic line is disposable within the first recess or the second recess.

2. The hydraulic brake control device of claim 1, wherein an outer profile of the housing is symmetric in shape about a length of an axis extending along a length of the housing.

3. The hydraulic brake control device of claim 2, further comprising:
   a clamp centered on the axis.

4. The hydraulic brake control device of claim 3, wherein the clamp is configured for mounting the brake control device on a handlebar.

5. The hydraulic brake control device of claim 1, further comprising:
   a shift lever; and
   a shift control device configured to initiate a gear shift based on input from the shift lever.

6. The hydraulic brake control device of claim 5, further comprising:
   a battery disposed in the housing and configured to provide power to the shift control device; and
   an antenna configured to transmit a gear shift signal generated by the shift control device.

7. The hydraulic brake control device of claim 1, further comprising:
   an outlet tube extending from the first recess to the second recess, through the housing,
   wherein the outlet tube is configured to interface with the hydraulic line.

8. The hydraulic brake control device of claim 7, wherein the outlet tube is configured to interface with the hydraulic line within the first recess at the first side of the housing or within the second recess at the second side of the housing.

9. The hydraulic brake control device of claim 1, further comprising:
   a piston assembly including a piston slidably disposed within a master cylinder aperture arranged in the housing; and
   a brake lever operatively coupled to the piston such that the brake lever moves the piston from a rest position to an actuated position.

10. The hydraulic brake control device of claim 9, further comprising:
    a hydraulic fluid reservoir disposed in the housing; and
    a sleeve disposed in the master cylinder aperture, the hydraulic fluid reservoir being fluidly connectable with an interior of the master cylinder aperture, and
    wherein the interior of the master cylinder aperture is fluidly connectable with an outlet tube.

11. The hydraulic brake control device of claim 1, wherein the housing further comprises an aperture that extends from the first recess, through the housing, to the second recess, and
    wherein the first recess extends from the aperture, along the first side of the housing, to the end of the housing, and the second recess extends from the aperture, along the second side of the housing, to the end of the housing.

12. A brake control device comprising:
    a housing having a first side, a second side, and an end, the first side and the second side of the housing being disposed on either side of a plane defined by an axis of symmetry extending along a length of the housing, the housing comprising a first hydraulic line path and a second hydraulic line path, the first hydraulic line path including a first recess at the first side of the housing and the second hydraulic line path including a second recess at the second side of the housing; and
    a clamp configured to attach the brake control device to a bicycle,
    wherein the clamp is attached to a handlebar mounting portion of the housing and is centered about the axis of symmetry, and
    wherein the first recess extends along the first side of the housing, towards the handlebar mounting portion of the housing, and the second recess extends along the second side of the housing, towards the handlebar mounting portion of the housing, such that a hydraulic line is disposable within the first recess or the second recess.

13. The brake control device of claim 12, wherein an outer profile of the housing is symmetric on either side of the plane defined by the axis of symmetry.

14. The brake control device of claim 12, further comprising:
    an outlet tube extending from the first recess to the second recess, through the housing,
    wherein the outlet tube is configured to interface with the hydraulic line.

15. The brake control device of claim 14, wherein the outlet tube is configured to interface with the hydraulic line within the first recess at the first side of the housing or within the second recess at the second side of the housing.

16. The brake control device of claim 12, further comprising:
    a shift lever; and
    a shift control device configured to initiate a gear shift based on input from the shift control lever.

17. The brake control device of claim 16, further comprising:
   a battery configured to provide power to the shift control device; and
   an antenna configured to transmit a gear shift signal generated by the shift control device.

18. The brake control device of claim 12, further comprising:
   a piston assembly including a piston slidably disposed within a master cylinder aperture arranged in a horn portion of the housing; and
   a brake lever operatively coupled to the piston such that the brake lever moves the piston from a rest position to an actuated position.

19. The brake control device of claim 18, further comprising:
   a hydraulic fluid reservoir disposed in the housing and in fluid communication with the master cylinder aperture; and
   a reservoir plug disposed in an aperture in the housing and configured to seal the hydraulic fluid reservoir.

20. A brake system comprising:
   a braking control device comprising:
      a housing having a first side, a second side, and an end, the second side being opposite the first side, wherein the housing comprises:
         a master cylinder aperture; and
         a first hydraulic line path and a second hydraulic line path, the first hydraulic line path including a first recess at the first side of the housing and the second hydraulic line path including a second recess at the second side of the housing,
   wherein the first hydraulic line path and the second hydraulic line path are configured to support a hydraulic line in fluid communication with the master cylinder aperture, and
   wherein the first recess extends along the first side of the housing, towards the end of the housing, and the second recess extends along the second side of the housing, towards the end of the housing, such that the hydraulic line is disposable within the first recess or the second recess.

* * * * *